United States Patent [19]

Deem

[11] 3,838,895
[45] Oct. 1, 1974

[54] DUAL PILOT CHECK VALVE VEHICLE BRAKING SYSTEM

[75] Inventor: Brian C. Deem, Elyria, Ohio

[73] Assignee: The Bendix Corporation, South Bend, Ind.

[22] Filed: Sept. 5, 1972

[21] Appl. No.: 286,521

[52] U.S. Cl. ............... 303/84 A, 188/106 P, 303/13
[51] Int. Cl. ............................................. B60t 15/46
[58] Field of Search .......... 303/84 AV, 13, 10, 6, 2, 303/9, 7, 63; 188/170, 106 P; 137/522, DIG. 2

[56] References Cited
UNITED STATES PATENTS

| | | | |
|---|---|---|---|
| 3,294,455 | 12/1966 | Valentine | 303/84 R |
| 3,504,946 | 4/1970 | Valentine et al. | 303/13 |
| 3,617,096 | 11/1971 | Grabb et al. | 303/13 |
| 3,677,607 | 7/1972 | Schultz et al. | 303/10 |

Primary Examiner—Trygve M. Blix
Assistant Examiner—D. C. Butler
Attorney, Agent, or Firm—Ken C. Decker; William N. Antonis

[57] ABSTRACT

A vehicle braking system is disclosed which includes disc brakes having both service actuators which are operated by fluid pressure, and fail-safe spring actuators which are held off by fluid pressure to permit normal actuation of the service brakes. The braking system includes a first fluid pressure circuit for actuating some of the service actuators and a second fluid pressure circuit for actuating the remaining actuators. Hold-off pressure may be supplied to the spring actuators from either or both of the fluid pressure circuits. A valve is provided which maintains the hold-off pressure in the spring brakes even though the pressure in both of the fluid pressure sources may decrease. However, when the sum of the fluid pressures in both the fluid pressure sources drops below a predetermined amount, the valve vents the hold-off pressure from the spring actuators to permit the latter to effect an emergency brake application.

11 Claims, 2 Drawing Figures

DUAL PILOT CHECK VALVE VEHICLE BRAKING SYSTEM

BACKGROUND OF THE INVENTION

This invention relates to a fluid pressure braking system for a vehicle having both service brake actuators and emergency failsafe or spring brake actuators.

In order to effect a brake application in a commercial heavy duty vehicle should the primary brake actuating system fail, it has become necessary to prove an emergency failsafe brake actuator so that the brakes of the vehicle may be actuated in case a complete failure occurs in the vehicle's brake actuating system. The emergency actuation system normally includes a spring actuator which is provided in addition to the normal fluid-operated service actuators in the vehicle foundation brakes. The spring actuator is opposed by fluid pressure during normal operation of the braking system and is used to apply the brakes only when a failure occurs or when the vehicle is parked and the so-called hold-off pressure to the spring brake is vented by operation of a conventional parking brake control valve.

For safety, it has also become necessary to provide a pair of separate hydraulic systems, one of which actuates some of the service actuators, and the other of which actuates the remaining service actuators. Therefore, it is desirable only to apply the emergency or spring brake when the fluid pressure levels in both of the hydraulic systems fail, thereby leaving the failsafe brake as the only means of stopping the vehicle. Even though it is desirable to apply the emergency or spring brake during failure of both of the vehicle's braking systems, it is not permissible that the spring brakes drag or come on slowly while the driver is pumping his brakes in the normal manner after the vehicle's engine dies, thereby causing an interruption in operation of the vehicle's fluid power source. However, it is desirable to use the fluid pressure stored in the energy sources provided in both of the systems' brake circuits to some predetermined minimal amount before the spring brake actuators are applied. On the other hand, once this minimum level of fluid pressure is achieved at which it would be most dangerous to depend on the fluid pressure supply to apply the service brakes, the spring brakes should be applied quickly. The present invention provides a solution to this problem by making the spring brakes unaffected by the loss of pressure in only one circuit and responsive solely to the sum of the braking pressures in both circuits dropping below some predetermined minimum level, while maintaining sufficient pressure in the spring brake hold-off device to prevent any premature application of the emergency or spring brake at a low fluid pressure force level. Although the instant invention is described as a hydraulic pressure braking system, it will be readily apparent to those skilled in the art that the teachings of this invention are equally applicable to other fluid-pressure actuated braking systems, such as systems which are actuated by compressed air.

SUMMARY OF THE INVENTION

Therefore, an important object of my invention is to provide a fluid pressure braking system for a vehicle having both service brake actuators and spring brake actuators, and which includes a valve which maintains hold-off pressure in the spring brakes until the sum of the fluid pressure levels in both of the vehicle's hydraulic systems drops below a predetermined level.

Another important object of my invention is to permit the spring brake actuator from "dragging" or applying prematurely as the fluid in the braking systems is depleted during a normal brake application.

DETAILED DESCRIPTION

Figure 1:
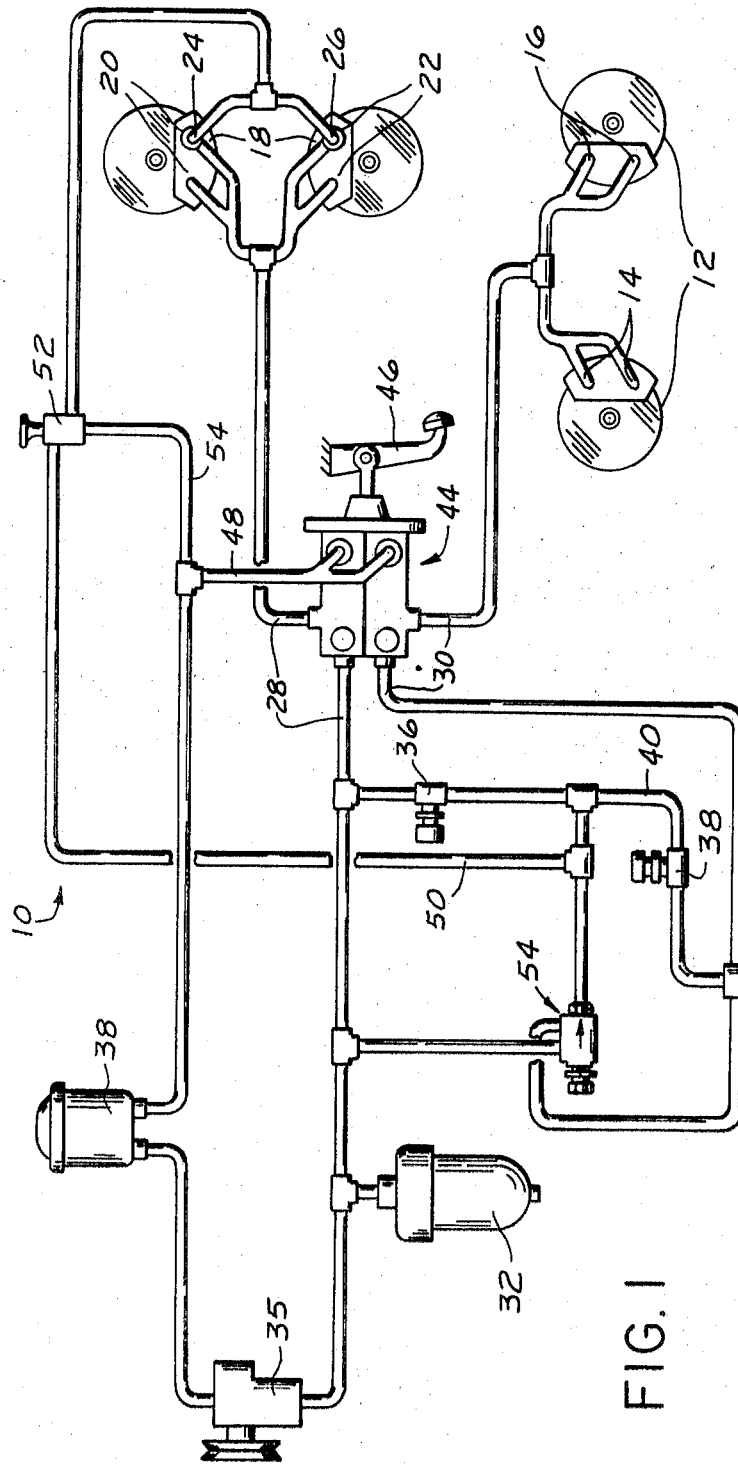
FIG. 1 is a schematic illustration of a vehicle fluid pressure braking system made pursuant to the teachings of my present invention.

Referring now to the drawings, a braking system generally indicated by the numeral 10 includes disc brakes 12 mounted on the front wheels of the vehicle each of which include a pair of service actuators 14 and 16. The disc brakes 12 are preferably made pursuant to the teachings of U.S. Pat. No. 3,677,372, owned by the assignee of the present invention and incorporated herein by reference. Similarly, the rear wheels of the vehicle are provided with disc brakes 18, which include service actuators 20, 22 and spring actuators 24, 26. The brakes 18 are preferably made pursuant to the teachings of U.S. Pat. No. 3,647,030, which discloses such a spring-actuated disc brake, and which is also owned by the assignee of the present invention. Since details of the construction of the brakes 12 and 18 form no part of the present invention, they will not be disclosed herein in detail. However, the service brake actuators 14, 16, 20, and 22 are actuated by fluid pressure delivered to the latter from the system 10 when the vehicle operator effects a brake application. When the vehicle is in motion with the hydraulic system 10 operating properly, the spring brake actuators 24 and 26 are supplied with "hold-off" pressure so that the springs are compressed and the brakes 18 are released. However, when the hold-off pressure is removed from the brake actuators 24 and 26, the spring automatically applies the brakes 18, thereby stopping the vehicle automatically in case of a failure in the fluid pressure system 10 that will be more completely described hereinafter.

The fluid pressure braking system 10 further includes a first hydraulic circuit 28 for actuating the service brake actuators 20 and 22, and a second hydraulic circuit 30, for actuating the service brake actuators 14 and 16. Fluid pressure accumulators 32, 34 are provided to supply pressurized fluid to the circuits 28 and 30, respectively. Both of the accumulators 32 and 34 are made pursuant to the teachings of U.S. Pat. No. 3,282,786, owned by the assignee of the present invention and incorporated herein by reference. Since the detailed construction of the accumulators 32 and 34 form no part of the present invention, they will not be described in detail, herein. Accumulators 32, 34 are both charged with fluid pressure from a pump 35 which pressurizes fluid from a system reservoir 38. The pump 35 is powered by the engine of the vehicle and, during normal operation of the pump, supplies sufficient fluid pressure to maintain the charge on the accumulators 32 and 34 at a maximum level. In order to maintain isolation between the systems 28 and 30 so that a failure of one of the systems 28 or 30 will not result in a failure in the other system, shutoff valves 36, 38 are provided in the branch circuit 40 which communicates the accumulator 32 to the accumulator 34. Should the pressure in the hydraulic circuit 28 fall below some predetermined level, the shutoff valve 36 automatically terminates fluid communication through the conduit 40. Similarly, should the hydraulic pressure in the system 30 drop below some predetermined level, the shutoff valve 38 maintains the integrity of the system 28. The hydraulic system 28 is connected through one side of a dual circuit hydraulic brake control valve generally indicated by the numeral 44, and the hydraulic circuit 30 is connected to the other side of the brake control valve 44. The valve 44 is operated by a conventional brake pedal 46 mounted in the operator's compartment of the vehicle, so that, upon operation of the foot pedal 46, the hydraulic pressure in the circuit 28 is communicated to the service actuators 20 and 22 and the fluid pressure in the circuit 30 is communicated to the service actuators 14, 16. When the brakes of the vehicle are released, the fluid pressure in the service actuators 14, 16, 20, and 22 are vented to the reservoir 38 through a conduit 48. Therefore, when the brakes of the vehicle are released, all of the service actuators are vented to the common reservoir 38 to release the vehicle's brakes. When a brake application is effected, the control valve 44 communicates high pressure fluid from the accumulator 32 or 34 into the service actuators to effect a brake application. The control valve 44 is preferably made pursuant to the teachings of U.S. Pat. No. 3,469,890 owned by the assignee of the present invention and incorporated herein by reference.

Hold-off pressure is supplied to the spring brake actuators 24 and 26 through a hold-off circuit generally indicated by the numeral 50. The hold-off circuit 50 is communicated to the branch circuit 40 at a point between the shutoff valve 36 and 38, so that, as long as fluid pressure remains available in either of the accumulators 32 or 34, fluid pressure will also be communicated into the hold-off circuit 50. The circuit 50 is further communicated through a parking control valve 52 which is mounted in the vehicle operator's compartment. The parking control valve is shiftable from a first condition permitting fluid communication through the hold-off circuit 50 into the spring brake actuators 24 and 26 to a second position in which the spring brake actuators 24 and 26 are vented back to the reservoir 38 through a branch line 54. The parking control valve is of completely conventional construction and will not be described in detail herein. It will be noted, that when the control valve 52 is in the first position and the vehicle is operating normally and the fluid pressure is available in the system 10, this fluid pressure system will be communicated to the spring brakes 24 and 26, thereby releasing the latter. However, when the vehicle operator moves the parking control valve 52 to the second position, the hold-off devices forming a part of the spring brakes 24 and 26 will be vented to the reservoir 38, thereby permitting the spring actuators 24 and 26 to apply their associated brakes 18.

A valve generally indicated by the numeral 54 is provided in the hydraulic circuit 50 to maintain hold-off pressure to the spring brakes 24 and 26 so long as some of the fluid pressure levels in the hydraulic circuit 28 and 30 exceeds a predetermined minimum. The valve 54 includes an outlet port 56 which is communicated to the spring brakes 24 and 26 through the hold-off circuit 50, a first inlet port 58 which is communicated to the accumulator 34, and a second inlet port 60 which is communicated to the accumulator 32. The valve 54 includes a housing 62 defining a stepped bore 64 therewithin having a larger diameter portion 66 and a smaller diameter portion 68 defining a shoulder 70 therebetween. A stepped piston 72 is slidably mounted within the bore 64 and has a smaller diameter portion 74 which is slidably received in the smaller portion 66 of the bore 64 and a larger diameter portion 76 which is slidably received in the larger diameter portion of the bore 66. The sections 74 and 76 of the piston 72 cooperate to define a shoulder 78 therebetween which cooperates with the shoulder 70 on the wall of the bore 64 to define an annular fluid cavity 80 therebetween which communicates with the inlet port 60. Resilient means 82 yieldably urge the piston 72 to the right viewing FIG. 2. The smaller diameter end of the piston 72 cooperates with the corresponding end of the bore 64 to define a fluid compartment 84 therebetween which is communicated both to the outlet port 56 and to the inlet port 58. Check valve means generally indicated by the numeral 86 are disposed in the compartment 84 and are so constructed and arranged so that pressure communication from the inlet port 58 to the outlet port 56 is always permitted, but fluid pressure communication in the reverse direction is usually prevented. As can be seen from FIG. 2, pressure in the chamber 84 reacts on the first fluid pressure reaction area defined by the end of the piston 74 and pressure at the inlet port 60 acts on a second fluid pressure reaction area on the piston 72 defined by the shoulder 78. Therefore, as long as either of these pressures, or the sum of both of them, are above a predetermined minimum level sufficient to overcome the resilient means 82, the end of the rightwardmost end (viewing FIG. 2) of the piston 72 will be urged away from the valve means 86, so that fluid communication from the outlet 56 to the inlet port 58 will be prevented. However, when the sum of the fluid pressures acting on the reaction areas of the piston 72 falls below a predetermined minimum level the resilient means 82 will urge the piston 72 to the right viewing FIG. 2, thereby maintaining the valve means 86 open to vent the outlet port 56 to the inlet port 58.

MODE OF OPERATION

Figure 2:
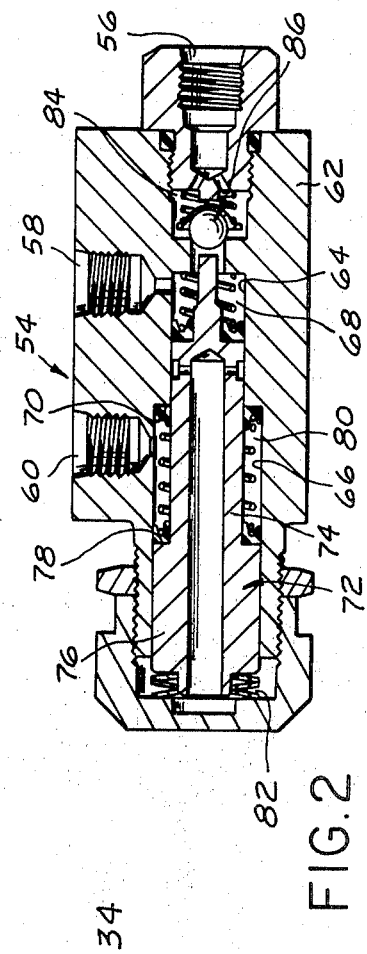
FIG. 2 is a cross-sectional view of a valve used in the braking system illustrated in FIG. 1.

Assuming normal operation of the system 10, operation of the pump 35 charges the accumulators 32 and 34 as discussed hereinabove. When the fluid pressure level in the accumulators 32 and 34 reaches some predetermined level, and assuming that the parking control valve 52 is in the first position, hold-off pressure will be supplied from the accumulators to the spring brake actuators 24 and 26 to release the latter. The vehicle may now be moved, and the service brakes may be applied by operation of the control valve 44 to communicate hydraulic pressure to the service brake actuators as discussed hereinabove. As long as the vehicle's engine operates normally, the pump 35 will maintain the accumulators 32 and 34 at their proper fluid pressure level. Since the accumulator pressure level is communicated to the inlet ports 58 and 60 from the accumulators 34 and 32, respectively, the piston 72 remains in its leftwardmost position as is illustrated in FIG. 2, thereby permitting fluid communication through the compartment 84 from inlet port 58 to the outlet port 56, but preventing communication in the reverse direction.

If one of the hydraulic circuits 28 or 30 should fail, due for example, to a rupture in one of the fluid lines, the integrity of the other system will remain. For example, assuming a rupture in one of the lines of the hydraulic circuit 28 thereby depleting the fluid content of the accumulator 32, the shut-off valve 36 will prevent communication through the branch line 40 after the pressure in the hydraulic circuit 28 reaches a predetermined low level. Therefore, the integrity of the circuit 30 will not be affected. However, since the hold-off circuit 50 communicates to the branch line 40 between the shutoff valves 36 and 38, fluid pressure from the accumulator 34 will be available to maintain hold-off pressure in the spring brakes 24 and 26. Similarly, fluid pressure from the accumulator 34 will be communicated to the inlet port 58 of valve 54, thereby maintaining the piston 72 in the position illustrated in FIG. 2. If a failure should occur in the hydraulic circuit 30, thereby depleting the fluid content of the accumulator 34, shutoff valve 38 will maintain integrity of the hydraulic system 28. Hold-off circuit 50 will then be pressurized from the fluid content of the accumulator 32 alone, and the pressure from accumulator 32 communicated to inlet port 60 of the valve 54 will maintain the piston 72 in the position illustrated. Thereby, the hold-off fluid pressure will be maintained in the spring brakes 24 and 26 if a malfunction occurs in one of the hydraulic systems 28 or 30 while the other hydraulic system is operating at normal pressure. Of course, appropriate warning devices would be included in the circuits 28 and 30 to apprise the vehicle operator of the failed circuit condition.

If a failure should occur in both the circuits 28 and 30 simultaneously, such as, for example, when the vehicle's engine dies thereby terminating operation of the pump 35, it is desirable to permit the vehicle operator to modulate the service brakes while depleting the fluid stored in the accumulators 32 and 34 without an abrupt application of the spring brake and without the latter "dragging" while the invention is being stopped. If such a failure occurs, the shutoff valves 36 and 38 will terminate fluid communication through the branch line 40 when the pressure levels in the accumulators 32 and 34 reach the predetermined minimum safe values. However, the shutoff pressure necessary to actuate the shutoff valves 36 and 38 is much higher than the hold-off pressure required to release the spring brake actuators 24 and 26. Therefore, hold-off pressure will be trapped in the hold-off circuit 50 when the pump 35 ceases to function, since the valves 36, 38 and the valve means 84 within the valve housing 54 prevent escape of fluid pressure from the spring brake actuators 24 and 26, assuming, of course, that the parking control valve 52 remains in the first position. The vehicle operator may then modulate the service brakes to brake the vehicle to a safe stop by depleting the fluid pressure content stored in the accumulators 32 and 34. When the accumulators 32 and 34 are depleted to a pressure level which is just barely sufficient to actuate the service brake actuators, the pressure level at the inlet ports 58 and 60 of the valve means 54 will also be depleted to a relatively low level which is insufficient to overcome the resiliency of the resilient means 82. At this time, the resilient means 82 urges the piston 72 to the right viewing the FIG. 2, to open the valve element 86 to thereby vent the outlet port 56 to the inlet port 58 to vent the hold-off fluid pressure in the spring brakes 24 and 26.

At this time, the spring brakes would be applied. However, it is noted that as long as the sum of the fluid pressures available in either of the accumulators 32 or 34 is sufficient to actuate the service brake actuators, the valve means 54 maintain the hold-off pressure in the spring brakes 24 and 26 so that the latter will not be applied to abruptly stop the vehicle.

I claim:

1. In a fluid pressure braking system for a wheeled vehicle:
   brake means for said wheeled vehicle, said brake means including service actuators for effecting a brake actuation when fluid pressure is communicated thereto;
   a first fluid pressure source for actuating a portion of said service actuators and a second fluid pressure source for actuating the remainder of said service actuators;
   control means actuated by the vehicle operator to communicate said first and second pressure sources with their corresponding service actuators when a brake application is effected;
   at least a portion of said brake means including failsafe means for actuating said brakes, said failsafe means being responsive to hold-off pressure to release said brakes to permit actuation of the latter by said service actuators;
   valve means responsive to each of said pressure sources for venting said hold-off pressure when the sum of the fluid pressure levels developed in said sources drops below a predetermined level; and
   a fluid pressure circuit communicating each of said pressure sources with said failsafe means to supply the latter with said hold-off pressure;
   said valve means being located in said circuit and normally permitting communication into said failsafe means but preventing communication from said failsafe means, said valve means opening to vent said failsafe means when the sum of the fluid pressure levels developed in said sources drops below said predetermined level.

2. The invention of claim 1; and
   shutoff means operably connected to each of said fluid pressure sources for terminating fluid communication from the latter when the fluid pressure level in a corresponding source drops below a predetermined level.

3. The invention of claim 1:
   said valve means including a first inlet communicated to one of said pressure sources, an outlet communicated to said failsafe means, valve elements normally permitting communication from said first inlet to said outlet but preventing communication in the reverse direction, a second inlet communicated with the other fluid pressure source, and pressure responsive means responsive to the fluid pressure level at both of said inlet ports to open said valve elements and permit communication from the outlet to the first inlet when the sum of the fluid pressure levels at said inlet ports drops below said predetermined level.

4. The invention of claim 1:
   an operator-operated control device in said fluid pressure circuit shiftable from a first position permitting communication through said circuit to provide said hold-off pressure to said failsafe means to a second position venting said hold-off pressure and preventing communication through said circuit to said failsafe means.

5. The invention of claim 1:
each of said fluid pressure sources including a device for storing pressurized fluid; and
means for developing fluid pressure to charge said devices for storing pressurized fluid.

6. The invention of claim 1:
said predetermined level being less than the normal fluid pressure level in either individual source.

7. In a fluid pressure braking system for a wheeled vehicle:
brake means for said wheeled vehicle, said brake means including service actuators for effecting a brake actuation when fluid pressure is communicated thereto;
a first fluid pressure source for actuating a portion of said service actuators and a second fluid pressure source for actuating the remainder of said service actuators;
control means actuated by the vehicle operator to communicate said first and second pressure sources with their corresponding service actuators when a brake application is effected;
at least a portion of said brake means including failsafe means for actuating said brakes, said failsafe means being responsive to hold-off pressure to release said brakes to permit actuation of the latter by said service actuators; and
valve means responsive to each of said pressure sources for venting said hold-off pressure when the sum of the fluid pressure levels developed in said sources drops below a predetermined level;
said valve means including normally closed valve elements opening to vent said failsafe means, an operating member movable toward and away from a position opening said valve elements means yieldably urging said operating member toward the position opening said valve elements, said valve operating member having first and second reaction areas exposed to the fluid pressure level from said first and second sources respectively, the force generated on said operating members by each of said sources acting on said reaction areas urging said operating member in a common direction in opposition to said resilient means.

8. The invention of claim 7:
the force generated on said operating member by either of said sources acting alone on its corresponding reaction area upon failure of the other source being greater than the force exerted by the yieldable urging means on said operating member.

9. The invention of claim 8:
said valve means including a first inlet communicated to one of said pressure sources and to said first reaction area, an outlet communicated to said failure means, said valve elements normally permitting communication from said first inlet to said outlet but preventing communication in the reverse direction, and a second inlet communicated with the other fluid pressure source and to said second reaction area.

10. In a fluid pressure braking system for a wheeled vehicle:
brake means for said wheeled vehicle, said brake means including service actuators for effecting a brake actuation when fluid pressure is communicated thereto;
a first fluid pressure source for actuating a portion of said service actuators and a second fluid pressure source for actuating the remainder of said service actuators;
control means actuated by the vehicle operator to communicate said first and second pressure sources with their corresponding service actuators when a brake application is effected;
at least a portion of said brake means including failsafe means for actuating said brakes, said failsafe means being responsive to hold-off pressure to release said brakes to permit actuation of the latter by said service actuators;
valve means responsive to each of said pressure sources for venting said hold-off pressure when the sum of the fluid pressure levels developed in said sources drops below a predetermined level; and
a fluid pressure circuit communicating each of said pressure sources with said failsafe means to supply the latter with said hold-off pressure;
said valve means being located in said circuit and normally permitting communication into said failsafe means but preventing communication from said failsafe means, said valve means opening to vent said failsafe means when the sum of the fluid pressure levels developed in said sources drops below said predetermined level;
said valve means including a housing defining a bore therewithin having first and second inlet ports and an outlet port, a piston slidable in said bore, one end of said piston cooperating with the end of said bore to define a compartment therebetween, said first inlet communicating said compartment with one of said pressure sources, said outlet communicating said compartment with said failsafe means, valve elements in said compartment normally permitting fluid communication from the first inlet to the outlet but preventing fluid communication in the reverse direction, resilient means yieldably urging said piston towards a position opening said valve elements to permit communication from said outlet to the first inlet, said one end of said piston defining a first fluid reaction area, a second fluid reaction area defined on said piston exposed to the pressure at said second inlet, whereby said piston is moved away from said valve elements as long as the sum of the fluid pressure levels acting on said reaction areas exceeds a predetermined level sufficient to oppose said resilient means.

11. The invention of claim 10:
said bore being stepped to define larger and smaller diameter portions with a shoulder therebetween, said piston being stepped to define larger and smaller diameter portions with a shoulder therebetween, the shoulder on said piston cooperating with the shoulder on said bore to define a cavity therebetween communicated to said second inlet, the shoulder on said piston defining said second fluid pressure reaction area.

* * * * *